United States Patent
Walter

(10) Patent No.: US 10,504,063 B2
(45) Date of Patent: Dec. 10, 2019

(54) SYSTEM AND METHOD FOR AD-HOC MODIFICATION OF A PROCESS DURING RUNTIME

(75) Inventor: Philipp Walter, Heusweiler-Holz (DE)

(73) Assignee: SOFTWARE AG, Darmstadt (DE)

( * ) Notice: Subject to any disclaimer, the term of this patent is extended or adjusted under 35 U.S.C. 154(b) by 386 days.

(21) Appl. No.: 12/923,135

(22) Filed: Sep. 3, 2010

(65) Prior Publication Data
US 2012/0047078 A1    Feb. 23, 2012

(30) Foreign Application Priority Data
Aug. 18, 2010    (EP) .................................... 10173239

(51) Int. Cl.
*G06Q 10/10* (2012.01)
*G06F 8/656* (2018.01)

(52) U.S. Cl.
CPC ........... *G06Q 10/103* (2013.01); *G06F 8/656* (2018.02)

(58) Field of Classification Search
USPC ......................................................... 705/301
See application file for complete search history.

(56) References Cited

U.S. PATENT DOCUMENTS

| | | | |
|---|---|---|---|
| 7,370,335 B1 * | 5/2008 | White et al. | 719/328 |
| 7,406,424 B2 * | 7/2008 | Cheeniyil et al. | 705/301 |
| 2002/0065701 A1 * | 5/2002 | Kim | G06Q 10/06311 |
| | | | 705/7.13 |
| 2002/0175940 A1 * | 11/2002 | Lection | G06F 3/0482 |
| | | | 715/764 |
| 2003/0233374 A1 * | 12/2003 | Spinola et al. | 707/104.1 |
| 2004/0194107 A1 * | 9/2004 | Masuoka | 718/100 |
| 2006/0200767 A1 * | 9/2006 | Glaeske et al. | 715/700 |
| 2006/0224428 A1 * | 10/2006 | Schmidt et al. | 705/8 |
| 2006/0224702 A1 * | 10/2006 | Schmidt | G06Q 10/10 |
| | | | 709/219 |
| 2006/0259341 A1 * | 11/2006 | Fung et al. | 705/9 |
| 2010/0070422 A1 * | 3/2010 | Kikuchi et al. | 705/301 |
| 2011/0246991 A1 * | 10/2011 | Lu et al. | 718/100 |
| 2012/0016833 A1 * | 1/2012 | Janiesch et al. | 706/50 |

FOREIGN PATENT DOCUMENTS

EP    1762930 A1 *    3/2007    ............... G06F 9/44

OTHER PUBLICATIONS

Nicholas Kong, Tovi Grossman, Björn Hartmann, George Fitzmaurice and Maneesh Agrawala, "Delta: A Tool for Representing and Comparing Workflows", May 2012, CHI. (Year: 2012).*
Michiel Helvensteijn, "Delta Modeling Workflow", Jan. 2012, VaMaS. (Year: 2012).*

(Continued)

*Primary Examiner* — Paul R Fisher
(74) *Attorney, Agent, or Firm* — Nixon & Vanderhye, P.C.

(57) ABSTRACT

The present technology concerns a system for ad-hoc modification of a process running in a workflow management system (WFMS). The system includes an ad-hoc modification component adapted for extracting the process definition from the running process, modifying the process definition, and redeploying the modified process definition, so that the process runs based on the modified process definition.

20 Claims, 4 Drawing Sheets

(56) References Cited

OTHER PUBLICATIONS

Figure 1:
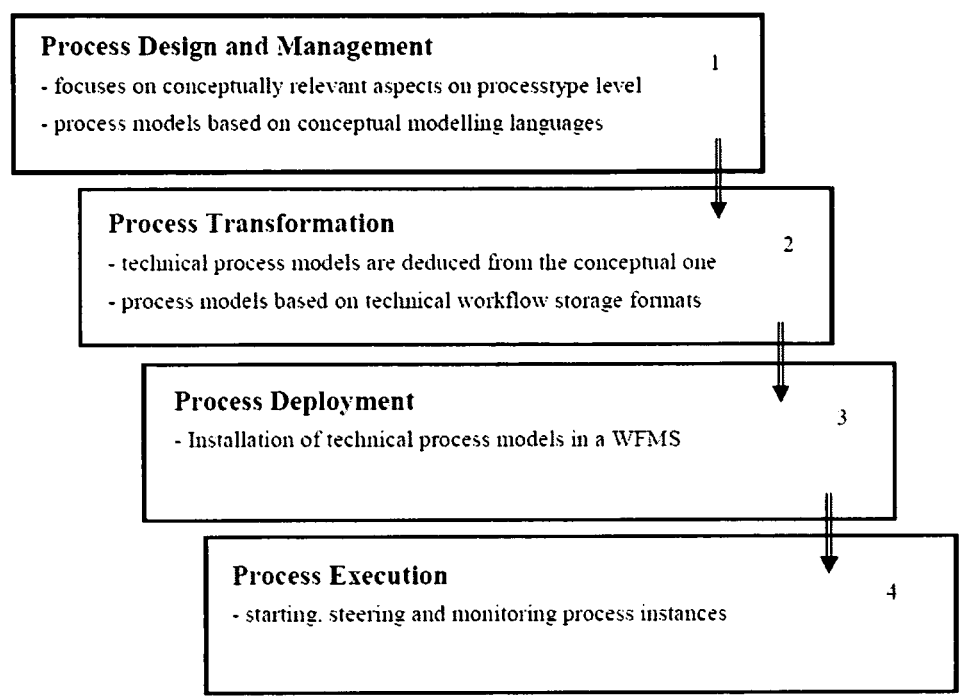

Huth, "Groupware-basiertes Ad-hoc-Workflow-Management: Das GroupProcess-System Konzeption und prototypische Implementierung einer 'Collaboration on Demand'-Lösung zur Unterstützung von schwach strukturierten Prozessen in Unternehmen", Dissertation of: Dipl.-Inform. Carsten Huth, Paderborn Jul. 2004, Universität Paderborn (281 pages) (with Machine Translation).

Huth et al., "GroupProcess: Graphisch interaktives Management von Ad-hoc-Geschäftsprozessen im Web", Groupware Competence Center (GCC); Universität Paderborn, p. 335-342 (with Machine Translation).

\* cited by examiner

SYSTEM AND METHOD FOR AD-HOC MODIFICATION OF A PROCESS DURING RUNTIME

This application claims the benefit of European Patent Application No. EP 10 173 239.4 filed Aug. 18, 2010, the content of which is incorporated by reference herein in its entirety.

1. TECHNICAL FIELD

The present technology relates to a system and a method for ad-hoc modification of a process during execution of the process.

2. BACKGROUND AND SUMMARY

The assembly of industrial components and goods has become a very complex challenge over the last years. Industrial manufacturing processes typically comprise multiple steps, which are not necessarily executed serially. Many modern manufacturing processes take place in parallel and in particular the respective steps may be distributed over large geographical distances.

Every single process step has to be clearly defined by itself and with respect to the other steps, i.e., preceding and succeeding steps. Otherwise the risk of producing rejects increases, which could be in security-relevant in the worst case.

The production of cars serves as an example for illustrating such problems. The assembly comprises many single process steps, among others manufacturing the car body, the chassis and the engine. Each component consists of many parts and thus requires a number of manufacturing steps itself. While many steps can only occur in serial, others may occur in a parallel to each other. For example, the car body and the engine may be manufactured in parallel to each other, while e.g., the engine itself will be manufactured in a more serialized manner. Moreover, the process of manufacturing single parts is typically outsourced to sub-contractors. In order to avoid delays through missing parts, an optimized supply chain is necessary. This example clarifies the complex structure of processes such as manufacturing goods.

Further, oftentimes changes of a process are necessary, e.g., due to technological progress. However, there may also be changes of processes required on a shorter time scale, i.e., if any kind of problem occurs. The latter changes relate to changes of the process that were typically not foreseen when the process was initially planned, so that the process has to be changed in an ad-hoc manner. For example, due to unforeseen technical problems, it may be necessary to change not only certain steps itself but also the sequence of several steps. Preferably, this should happen without having to stop the assembly line.

Typically, the monitoring and controlling of such processes is done by means of IT-infrastructure in order to satisfy the need for flexibility and reliability. The abovementioned example already hints that such an IT-infrastructure must be very complex and powerful. To this end, such systems usually are customized to fit a certain manufacturer's needs. Therefore, such systems cannot be easily modified or even exchanged once they are deployed, i.e. installed in the productive environment. Such processes are typically controlled by so-called Workflow Management Systems (WFMS).

In the prior art, several approaches are known for managing WFMS. For example, "ADEPT—Realisierung flexibler und zuverlässiger unternehmensweiter Workflow-Anwendungen" by Reichert, et al. mentions the requirement for ad-hoc modifications of processes. It discusses the need for consistency of such modifications, including adding, moving or deleting of single activities with respect to the ADEPT WFMS.

Further, "GroupProcess: Partizipatives, verteiltes Design und simultane Ausführung von Ad hoc Geschäftsprozessen" by Huth, et al. relates to ad-hoc modifications in order to cope with necessary, but unanticipated changes. This document merely states the problem besides other challenges to different kinds of workflows.

It is therefore the technical problem underlying the present technology to provide a system and a method that allows for quick and flexible adjustments of processes in a consistent manner, thereby overcoming the above mentioned problems at least in part.

This problem is according to one aspect of the technology solved by a system for ad-hoc modification of a process running in a workflow management system (WFMS). In the embodiment of claim 1, the process is defined by a process definition and the system comprises an ad-hoc modification component adapted for extracting the process definition from the running process, modifying the process definition, and redeploying the modified process definition, so that the process runs on the modified process definition, wherein the redeployment is performed without interrupting the running process.

According to this aspect of the present technology, a running process can be modified without the need for stopping the process. This is achieved by extracting the definition of the running process, which preferably comprises the sequence of all process steps and/or the respective activities to be carried out by each process step. The subsequent modification therefore does not occur on the running process itself, but on the extracted process definition. This allows for modifying the process definition during runtime without disrupting the execution of the running process. Further, the process can be modified in a manner that was not foreseen, i.e., planned, when the process was initially designed ("ad-hoc" modification). Therefore, any kind of e.g., assembly can continue while the modification takes place. The redeployment of the modified process definition happens preferably in one single step and thus also without interruptions. It will be appreciated that "without interruptions" is to be interpreted in that the redeployment may take a very short time span, e.g., milliseconds to seconds, however, a user will perceive the process modification and/or redeployment as happening in real-time. The reason is that parts of the running process can be modified without touching the original process which—if changed—would have to be retransformed into a technical, executable description (which usually requires additional manual work of a technician) of the process. Thus, it is possible to modify processes efficiently in real-time, i.e., within milliseconds to seconds without the need to retransform the original process. Without the technology, redesign, retransformation and redeployment of a process definition would have to be conducted manually and with involvement of a technician, thus taking at least several hours up to several days.

In a further aspect of the present technology, the ad-hoc modification component is separated from a process execution means adapted for running the process. Accordingly, separating these two components allows for a customization of the system to different process execution means. For example, the ad-hoc modification component may be provided once and subsequently be used by a plurality of different underlying process execution means.

In another aspect, the ad-hoc modification component communicates with the process execution means through an ad-hoc modification adapter. Accordingly, the ad-hoc modification adapter serves for translating between the ad-hoc modification component and the respective process execution means. Inserting an ad-hoc modification adapter can further simplify the communication between the process execution means and the ad-hoc modification component. As an example, only the adapter has to be configured to communicate with the different process execution means, while the ad-hoc modification component can remain unchanged. This reduces the amount of work for many kinds of changes, since only a smaller module has to be adapted.

In a further aspect, the ad-hoc modification adapter and the underlying process execution means communicate via a pre-defined interface. Since many different systems for managing processes are available, it is desirable to communicate with these systems in a standardized manner. This simplifies the complexity for adapting the ad-hoc modification module to a certain process execution means. Further, using a certain standard provides for improved interoperability with existing and also new products. In particular, a company relying on a certain product for managing processes could simply incorporate the ad-hoc modification component of the present technology without the need for adaptations to their own product, which usually poses huge technical problems. For example, a car manufacturer may have a large system for processing the manufacturing of a car, which may even be connected with one or more suppliers. Upgrading an existing system seems to be unrealistic. However, the advantageous approach of the present technology allows for a simple use of the ad-hoc modification component via a standard interface, thus not relying on a certain vendor.

Preferably, the extraction and the redeployment of the process are preformed by the ad-hoc modification adapter. It may be necessary to build an ad-hoc modification adapter as an extension which could then be integrated into the existing system. This adapter could take care of correctly migrating a certain running process instance to the modified process definition. This might be necessary, e.g., when the state of a process instance is not fully accessible from outside the system.

In yet another aspect, the process definition comprises at least two nodes representing process steps and at least one edge between the at least two nodes representing a transition between the process steps. As mentioned further above, a typical process comprises a number of process steps which are connected with one or more other process steps of the same process. By encapsulating the process definition, i.e., certain activities and the transitions between one or more of such activities, within nodes and edges it is possible to easily represent the process, e.g., in a graphical manner. This allows for a standardized modification of a certain process through an abstract representation.

The modification may comprise adding and/or removing at least one node and/or at least one edge. It is a particular feature of the present technology to allow not only for the modification of a certain activity comprised within a single node, but also to allow for modifying the whole process, i.e., to add or move or remove at least one node and/or edge. As an example, technological advance may allow for an improved manufacturing process. In this case it might be desirable to adjust the process in order to simplify and accelerate the manufacturing of a product, i.e., a car. It may also be required to remove certain steps because they become obsolete or to introduce a new activity to the process. The advantageous approach of the present technology allows for such a modification without stopping a running process instance and without the need for retransforming a defined process into a certain representation, e.g., a computer program product.

Additionally or alternatively, the modification may comprise reordering single steps of the process definition with or without modifying the process steps. It may also be desirable to simply reorder an existing process, i.e., the production of components or the subsequent manufacturing of these components on an assembly line.

In a further aspect, the modification of the process is instantaneously evaluated. An important feature is the possibility to evaluate any changes with respect to validity, governance rules, information flow integrity, etc. On the one hand, validity and information flow integrity can be achieved e.g., by inspecting information flow between process steps, thus ensuring that a process step cannot be moved to a position in the execution sequence where there is not enough information to execute it yet. On the other hand, governance rules can become effective by defining in advance e.g., during process design, which users may insert or delete which nodes and edges, thus further restricting possible modifications. In this way, problems occurring through erroneous modifications can be avoided. As an example, the change of quality requirements for security-relevant components could be restricted, such that they can only become stricter.

In another aspect, the modification comprises automatically migrating a running process from the former process definition to the modified process definition. By representing a complex process in an abstract and standardized manner, i.e., through nodes comprising activities and edges representing transitions between them an arbitrarily complex process can be mapped onto a modified version of the process. This important feature holds especially true if the ad-hoc modification component is separated from the processing system itself and is independent of this underlying processing system.

The present technology also concerns a method for ad-hoc modification of a process using any of the above systems. Further, a computer program is provided comprising instructions for implementing the above method.

3. SHORT DESCRIPTION OF THE DRAWINGS

Figure 2:
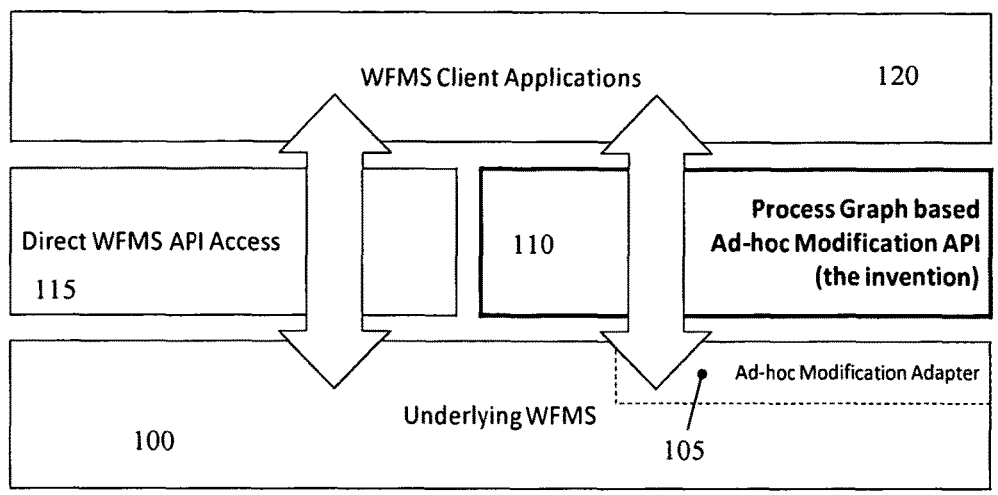
Figure 3:
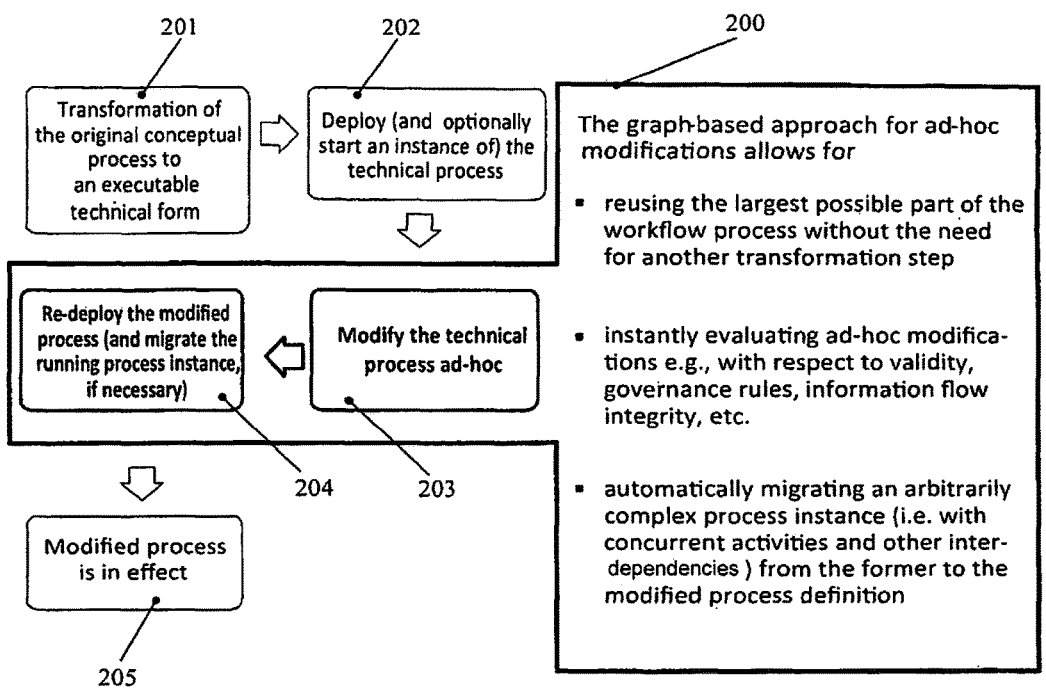
Figure 4:
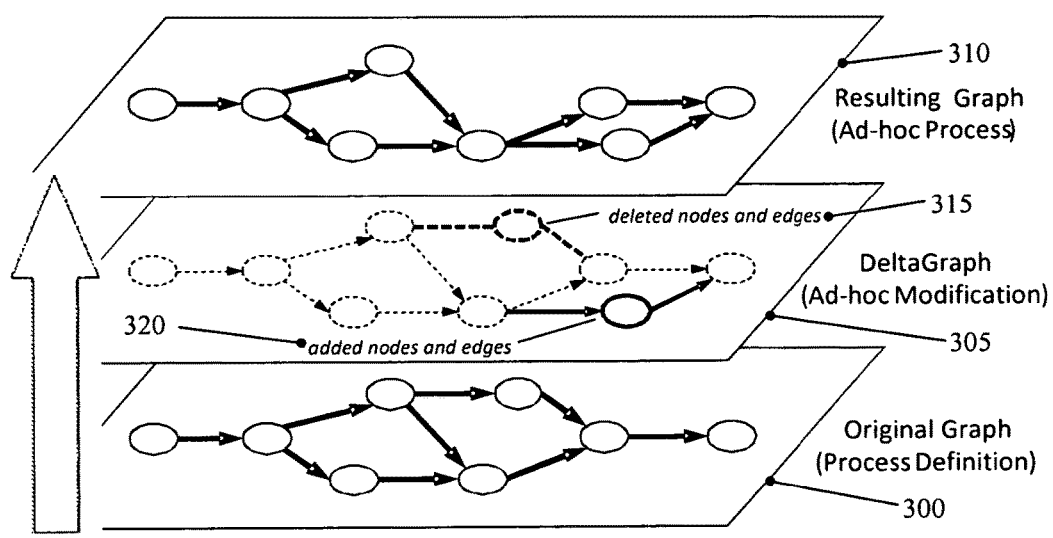

In the following detailed description, presently preferred embodiments are further described with reference to the following figures:

FIG. 1: The relation between BPM and workflow management;

FIG. 2: a diagram showing a traditional, non-ad-hoc capable WFMS and an aspect according to a preferred embodiment;

FIG. 3: a diagram showing the ad-hoc modification process of an already deployed process model according to a preferred embodiment; and FIG. 4: a diagram showing ad-hoc modification of a process graph according to a preferred embodiment by collecting changes in a DeltaGraph.

4. DETAILED DESCRIPTION

FIG. 1 shows the relation between Business Process Management and the technical implementation of models describing processes in a Workflow Management System (WFMS). Typical processes comprise a sequence of actions and events that are conducted by different employees in a company to reach a certain objective, e.g., accept a customer order, produce the ordered item, such as a car, deliver it to the customer and invoice it afterwards. Execution of such business processes can be supported with workflow management systems (e.g., ARIS Process Governance) which—once configured with a process model—assign process-related tasks in real-time and in the right sequence to the right employees and keep track of process-related documents and data. To reach such an automatic process execution, four fundamental steps must be conducted.

1. The design and management 1 of business processes require a conceptual perspective: here the focus lies on conceptual contexts, such as intra- and inter-organizational division of labor and interaction between human activities and their technical support. Technical details are considered only insofar as they are relevant to these contexts. From this conceptual perspective primarily complexity reduction is relevant, because otherwise extensive business processes would no longer be manageable as design objects. Business process models from the conceptual viewpoint therefore abstract from short-lived technical aspects and are designed for long-term validity. Subject of the design and management are therefore conceptual business process models on a type level, i.e., they abstract from single process runs and instead describe how "all processes of a certain type" should run, e.g., the assembly of a car. The prevalent language for such models is the EPC (event-driven process chain).

2. Transformation: the conceptual process model must be transformed 2 to a technical process model first. Here the focus lies on process components which should be executed automatically, or on activities of different employees to be controlled in the form of IT-based workflows. Other than from a conceptual point of view, technical details (also short-lived, possibly frequently changing) are essential from this perspective, because otherwise automatic execution would not be possible. I. e., a technical process model must be deduced from the conceptual one and all activities must be amended with additional technical information necessary for their execution, e. g., process variables for storing process information during execution, on-line forms for user interaction, etc. There is a variety of languages (more precisely: storage formats) for such technical process models, e. g., XPDL or BPMN 2.0 XML.

3. Deployment: the technical process model must be installed 3 in a WFMS so that the system allows for starting and tracking instances of the process. During deployment, the WFMS builds an internal representation of the process model that allows for its computationally efficient execution.

4. Execution 4 of these deployed process models allows employees to create process instances, i.e., representations of single process runs with all their specific data and documents, e.g., customer data, invoice total, etc. WFMS moreover track the state of process instances, i.e., who is working on which process-related tasks, which tasks are already finished and which tasks must be assigned next.

The design-to-execution procedure described above presupposes that during the design phase, every process can be specified in a sufficiently precise manner to allow for its step-by-step reproduction later during execution. However, there are certain types of processes—so-called weakly structured processes—that cannot be completely specified in advance, because they are highly interactive, knowledge-intensive or there are simply too many distinctive situations that can arise so that their evolvement cannot be anticipated completely. Though such processes may be modeled on a conceptual level during design phase, it is foreseeable that they must be adapted ad-hoc and efficiently in real-time at runtime. This raises significant difficulties for traditional WFMS, since changing a running process instance is usually only possible to a small extent (e. g. by delegating tasks), because fundamental changes to the underlying process model would require another transformation 2 and another deployment 3 of the changed process model.

Until reaching a productive state, the introduction of a WFMS is usually both cost-intensive and time-consuming. In addition to that, the decision for a specific WFMS product cannot be taken without considering the other IT infrastructure, since WFMS usually need many interfaces to other systems. That's why exchanging an established WFMS can be considered unrealistic, even if another system is clearly superior to the installed one. The majority of production-ready and/or installed WFMS do not support weakly structured processes natively.

FIG. 2 illustrates a preferred embodiment of the present technology. An underlying WFMS 100 executes a process 4, i.e., one or more process instances. As explained above, it may be necessary to modify the process, e.g., by adding new activities, removing existing activities or changing process logic. This should happen efficiently in real-time, e.g., in order to avoid delays of the assembly of parts. According to the present technology, this modification can be achieved by an ad-hoc modification API (application programming interface) 110, which is separated from the underlying WFMS 100. This is especially advantageous, since a single ad-hoc modification API may be used for a plurality of WFMS. Towards the client applications operated by the user, this API provides a unified interface consisting of one or more function blocks:

Functions for retrieval of information which is available in the WFMS at runtime, e.g., search functionality for process definitions, process instances and process variables, activities and transitions between them, users, roles and groups, as well as additional attributes to allow for transporting WFMS-specific attributes to the client application and back to WFMS.

Functions for creating template activities and transitions that provide simple ad-hoc functionality in the underlying WFMS, e.g., unconditionally and immediately starting an activity after its predecessor activity is finished, or assigning a generic manual task to a certain user.

Functions for changing a process definition e.g., by adding and deleting activities and transitions or by reordering activities.

Functions for managing the modification lifecycle of a process instance, e.g., by locking the instance, extracting its process definition, modifying and redeploying it.

It is preferred that the ad-hoc modification API 110 communicates with the underlying WFMS 100 e.g., according to the Workflow Client API (WADI) as defined by the Workflow Management Coalition (WFMC). In addition, a preferred embodiment of the present technology also features an additional ad-hoc modification adapter 105, which extends the WFMS API with basic ad-hoc read and write operations.

From the above it becomes clear that the present technology focuses on the technical implementation of such processes and in particular on the modification of such processes running on an IT-infrastructure.

The ad-hoc modification according to a preferred embodiment of the present technology will be described now with reference to FIG. 3. As already shown in FIG. 1, a process has to be designed, before it is transformed 201 and deployed 202. The preferred approach for ad-hoc modifications 203 according to the present technology allows for reusing the largest possible part of the workflow process without the need for another transformation step. It comprises an instantaneous evaluation of the ad-hoc modifications e.g., with respect to validity, governance rules, information flow, integrity, etc. It further allows for automatically migrating an arbitrarily complex process instance, i.e., with concurrent activities and other interdependencies, from the former to the modified process definition. This is achieved by tracing and collecting all changes to a process graph during a modification session in a DeltaGraph which represents the smallest set of changes necessary to get from the former to the final modified process version. This functionality is illustrated using an example process consisting of the four activities S (start), P1 and P2 (process steps) and E (end), which are originally executed in the given order (S, P1, P2, E). By using ad-hoc modification, execution of process step P1 shall be delayed until process step P2 is finished (S, P2, P1, E). Using the DeltaGraph, the activities defined for P1 and P2 remain unmodified, but the transitions between them are changed: S-P1 is changed to S-P2, P1-P2 is changed to P2-P1, and P2-E is changed to P1-E.

Then the modified process can be redeployed 204. If necessary, the running process instance can be migrated to the modified process definition. In the example given above, this automatic migration would only require to exchange the process definition which is used by the WFMS to look up the next activity to start once an activity of the running process instance is finished. In more complex cases, it may be necessary to terminate activities and start other ones, e.g., if an already active process step should be preceded by another one. Finally, the ad-hoc modified process is in effect 205. This ad-hoc modification API can be realized for example using the Java programming language.

There are multiple workflow storage format standards like XPDL, BPMN 2.0 XML, even Open Source variants like JPDL. Moreover, different vendors implement different "dialects" of these formats. However, they all have a common denominator: they can all be represented as directed graphs with nodes (activities) and edges (transitions between the activities). Thus a process model which is extracted from the WFMS at runtime can be always be encapsulated by a graph-oriented data structure with node objects acting as placeholder for activities and edge objects acting as placeholders for transitions in the workflow process model:

This procedure could be implemented using the jBPM open source workflow engine as a generic WFMS and using the Java Universal Network/Graph Framework as a basis. Of course, both the WFMS and the graph framework can be substituted if necessary. For the WFMS, a technically sufficient open source alternative would be Activiti which is in fact a fork of jBPM. From the graph framework, only one interface and its implementation are used, so these could even be replaced by own code.

Now the modification of a process model on a graph basis as explained in the last paragraph will be discussed with respect to FIG. 4. Once a process model is abstracted as a graph, all modifications like adding or removing nodes and edges can be tracked. In a preferred embodiment this is achieved through a Java class named DeltaGraph which takes a base graph 300 (i.e. the workflow process model to modify ad-hoc) and "collects" all changes 305 to this graph while leaving it untouched. In FIG. 4 there is one node and two edges connecting this node with other nodes deleted 320. Moreover, in this example a new node is added with edges (transitions) to other nodes 325.

Once modification is finished 310, all these changes can be applied in one step. Since the references from the original graph to the underlying workflow objects (activities, transitions) remain intact, technically complex information, e.g., about activity behaviors, does not need to be redeployed but can be reused, while structural aspects needing no extensive technical treatment can be changed ad-hoc. Thus it is possible to redeploy the modification at once, reusing the existing technical process information.

While executing a process instance, a WFMS tracks which activities are active. Once an activity is finished, the process definition underlying to the process instance is used by the WFMS to look up which transition from the finished activity has to be taken and which activity has to be started next. Since the activities of which the process definition consists remain unmodified, they can be reused to create the modified process definition. Thus the process instance to be modified can be adjusted so that the WFMS uses this modified definition for further look-ups.

Thus it is especially possible to reorder process steps without touching the activities (and their possibly complex implementation behavior). The case of added nodes which do not have an example in the workflow model yet can be treated using predefined task activities which simply generate worklist tasks for users. Additionally, one could provide other simple standard activities like data source access or web service transactions using user-customizable parameters. Similarly, added transitions can be represented by new default transitions, i.e. the WFMS equivalent of transition that has not special conditions but is taken by default as soon as its preceding activity is finished.

Moreover, it would be possible to specify restrictions for ad-hoc modifications during process design. First, certain nodes and/or edges can be marked with "modification not allowed". Second, invariants can be formulated quite easy by non-technical domain specialists, e.g., "activity B MUST follow activity A".

It is also possible to provide an additional implementation of the graph frame-work's graph interface which "collects" graph modifications and can apply them to the underlying graph. It is also possible to change the underlying workflow process model. As will be described below, the WFMS API standard provides mechanisms to modify workflow process models. Above that, since most workflow storage formats are based on XML, the reconstruction of the modified workflow model can as well take place on XML level.

Changing a running process instance comprises two steps which can be automatically conducted within milliseconds to seconds, so that the user will perceive the process modification as happening instantly in real-time:

1. The newly reconstructed process 310 containing the ad-hoc modifications must be deployed as a new process definition to allow for other instances of the process running unmodified. The WFMS must either provide an API function to deploy a new process definition or an ad-hoc modification extension to the WFMS must amend the WFMS by such functionality.

2. The running process instance must be migrated to the new process definition. If the WFMS does not provide a production-ready API function for that, it may be necessary e.g., to implement an ad-hoc modification adapter that WFMS-internally terminates the process instance and re-creates it using the same process attributes as the old instance. Thus, the process instance effectively runs on with the modifications in effect and without an interruption noticeable to the user. The relations between the former process model and the modified one allow for determining automatically which activities correspond to the formerly active activities and must therefore be activated, too.

The modification of a running process and the subsequent redeployment of such a process is a very complex task. In particular, the underlying WFMS 100 must provide a set of API functions. The de-facto standard is an API published by the Workflow Management Coalition (WFMC). The Workflow Management Coalition (WFMC) is a global organization of adopters, developers, consultants, analysts, as well as university and research groups engaged in workflow and BPM. The WFMC creates and contributes to process related standards, educates the market on related issues, and is the only standards organization that concentrates purely on process. The WFMC defined a Workflow Client API (WAPI) which consists of a number of data structures and API functions accessible to a client application. It is therefore assumed that a WFMS adheres to this specification.

Depending on the concrete realization of these interfaces in a specific WFMS, it may be necessary to develop an additional extension, an "ad-hoc modification adapter" 105, which is integrated into the WFMS that takes care of correctly migrating process instances to modified process definitions. This is necessary e.g., when the state of a process instance is not completely accessible from outside the WFMS, or if a migrated instance cannot be influenced freely, e.g., by defining its initially active activities. Such an adapter will be suited to a certain WFMS and augments its API with methods necessary to for the ad-hoc modification component to work. It must be integrated into the WFMS, e.g., by using the WFMS manufacturer's software development kit (SDK), and run within the WFMS itself. It provides access to WFMS-internal data structures and functions which can be used in ad-hoc modifications and takes care of integrity while redeploying a modified process instance.

It will be appreciated that the systems, APIs, and/or other components described may include any suitable combination of programmed logic circuitry (e.g., hardware, software, firmware, and/or the like). For example, the process execution programmed logic circuitry may include a processor that helps execute instructions and/or commands. In certain example embodiments, the definitions, instructions, commands, etc., may be stored in a suitable storage location (such as, for example, one or more databases, files, or other tangible and/or non-transitory memory locations). It will be appreciated that certain example embodiments may comprise a computer readable storage medium storing tangible and non-transitory instructions that, when executed by a processor, perform the above-described method steps. It also will be appreciated that the example methods disclosed herein may be executed, in whole or in part, by at least one processor of a system.

The invention claimed is:

1. A method for ad-hoc modification of a process, the method comprising:
at an information processing system having, at least, (a) a workflow management system (WFMS) configured to execute the process, the process including one or more process instances, (b) a workflow client application programming interface (API), and (c) an ad-hoc modification API separated from the WFMS and configured for use with a plurality of WFMS:
extracting the process definition from the running process in a workflow in the WFMS, the process definition being represented by a process graph;
performing ad-hoc modification, in real-time, of (a) one or more activities and/or (b) process logic in the process definition for the running process in the workflow by (i) collecting all changes to the process graph, without modifying the process graph, during a modification session in a DeltaGraph, the DeltaGraph including the respective modifications to the process graph and representing a smallest number of changes necessary to produce a resulting graph, and (ii) applying the DeltaGraph with the modifications to the process graph to create the resulting graph representing a modified process definition;
evaluating modifications of (a) the one or more activities and/or (b) the process logic in the process definition for the running process for validity; and
redeploying the modified process definition as a new process definition by migrating the running process to the new process definition thereby allowing other instances of the running process to remain unmodified and uninterrupted, so that the process in the workflow runs with respect to the new process definition,
wherein the WFMS further including an ad-hoc modification adapter configured to extend an API of the WFMS with, at least, ad-hoc read/write operation.

2. A system comprising processing circuitry that includes at least one processor, the system configured to perform ad-hoc modification of a process that is defined by a process definition, the system further comprising:
a workflow management system (WFMS) configured to execute the process, the process including one or more process instances;
a workflow client application programming interface (API); and
an ad-hoc modification API separated from the WFMS and configured for use with a plurality of WFMS, the ad-hoc modification API configured to communicate with the WFMS according to the workflow client API, the ad-hoc modification API further configured to:
a. extract the process definition from the running process in a workflow in the WFMS, the process definition being represented by a process graph;
b. perform ad-hoc modification, in real-time, of (a) one or more activities and/or (b) process logic in the process definition for the running process in the workflow by (i) collecting all changes to the process graph, without modifying the process graph, during a modification session in a DeltaGraph, the DeltaGraph including the respective modifications to the process graph and representing a smallest number of changes necessary to produce a resulting graph, and (ii) applying the DeltaGraph with the modifications to the process graph to create the resulting graph representing a modified process definition;
c. evaluate modifications of (a) the one or more activities and/or (b) the process logic in the process definition for the running process for validity; and
d. redeploy the modified process definition as a new process definition by migrating the running process to the new process definition thereby allowing other instances of the running process to remain unmodified and uninterrupted, so that the process in the workflow runs with respect to the new process definition,
wherein the WFMS further including an ad-hoc modification adapter configured to extend an API of the WFMS with, at least, ad-hoc read/write operation.

3. The system according to claim 2, wherein the ad-hoc modification component is configured to communicate with process execution programmed logic circuitry through an ad-hoc modification adapter.

4. The system according to claim 3, wherein the ad-hoc modification adapter and the process execution programmed logic circuitry are configured to communicate via a standard interface.

5. The system according to claim 3, wherein the extraction and the redeployment of the process are performed by the ad-hoc modification adapter.

6. The system according to claim 2, wherein the process definition comprises at least two nodes in the process graph representing process steps and at least one edge in the process graph between the at least two nodes representing a transition between the process steps.

7. The system according to claim 6, wherein the modification comprises adding and/or removing at least one node and/or at least one edge.

8. The system according to claim 2, wherein the modification comprises reordering single steps of the process definition without modifying the process steps.

9. The system according to claim 2, wherein the modification comprises automatically migrating a running process from the former process definition to the modified process definition.

10. The system according to claim 2, wherein the process definition is modified by (i) adding, deleting, and/or re-ordering one or more activities, and/or (ii) by adding and/or deleting one or more transitions in the process definition.

11. The system according to claim 2, wherein the process definition is dynamically modifiable during the running process.

12. The system according to claim 11, wherein the process definition is modified by adding, deleting, and/or re-ordering one or more activities.

13. The system according to claim 11, wherein the process definition is modified by adding and/or deleting one or more transitions in the process definition.

14. The system according to claim 12, wherein the process definition is modified by adding and/or deleting one or more transitions in the process definition.

15. The system according to claim 2, wherein when an activity finishes, the WFMS uses the process definition underlying the process instance to look up a transition from the finished activity.

16. The system according to claim 2, wherein the ad-hoc modification of the one or more activities and/or the process logic is instantaneously evaluated with respect to, at least, validity, governance rules, information flow, and integrity.

17. The system according to claim 2, wherein the running process is automatically migrated to the new process definition with concurrent activities and interdependencies.

18. The system according to claim 2, wherein all changes in the modified process definition are redeployed in a single step.

19. The system according to claim 2, wherein migration of the running process only requires exchange of the process definition that is used by the WFMS to look up a next activity to start once an activity of a running process instance associated with the running process is finished.

20. A non-transitory computer readable storage medium storing a computer program configured to perform ad-hoc modification of a process, the computer program comprising instructions which, when implemented in an information processing apparatus having, at least, (a) a workflow management system (WFMS), (b) a workflow client application programming interface (API), and (c) an ad-hoc modification API, cause the information processing apparatus to:

extract the process definition from the running process in a workflow in the WFMS, the process definition being represented by a process graph;

perform ad-hoc modification, in real-time, of (a) one or more activities and/or (b) process logic in the process definition for the running process in the workflow by (i) collecting all changes to the process graph, without modifying the process graph, during a modification session in a DeltaGraph, the DeltaGraph including the respective modifications to the process graph and representing a smallest number of changes necessary to produce a resulting graph, and (ii) applying the Delta-Graph with the modifications to the process graph to create the resulting graph representing a modified process definition;

evaluate modifications of (a) the one or more activities and/or (b) the process logic in the process definition for the running process for validity; and redeploy the modified process definition as a new process definition by migrating the running process to the new process definition thereby allowing other instances of the running process to remain unmodified and uninterrupted, so that the process in the workflow runs with respect to the new process definition, wherein the WFMS further including an ad-hoc modification adapter configured to extend an API of the WFMS with, at least, ad-hoc read/write operation.

* * * * *